J. E. McBRIDE.
CHAIN DRIVEN TROLLEY FOR CONVEYERS.
APPLICATION FILED DEC. 27, 1919.

1,371,316.

Patented Mar. 15, 1921.
2 SHEETS—SHEET 1.

Inventor
Jesse E. McBride

By Whittemore Hulbert & Whittemore
Attorneys

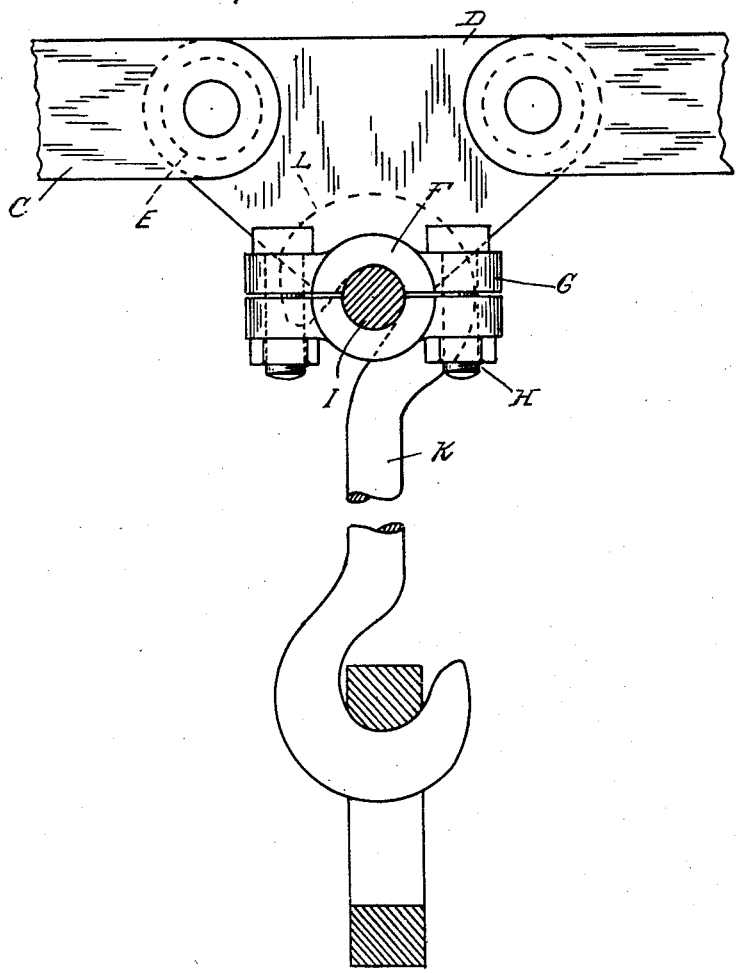

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

CHAIN-DRIVEN TROLLEY FOR CONVEYERS.

1,371,316.     Specification of Letters Patent.     Patented Mar. 15, 1921.

Application filed December 27, 1919. Serial No. 347,789.

*To all whom it may concern:*

Be it known that I, JESSE E. MCBRIDE, a citizen of the United States of America, residing at Detroit, in the county of Wayne and State of Michigan, have invented certain new and useful Improvements in Chain-Driven Trolleys for Conveyers, of which the following is a specification, reference being had therein to the accompanying drawings.

The invention relates to conveyers and consists in the novel construction of chain driven trolley as hereinafter set forth.

In the drawings:

Fig. 2 is a side elevation of the trolley.

Figure 1:
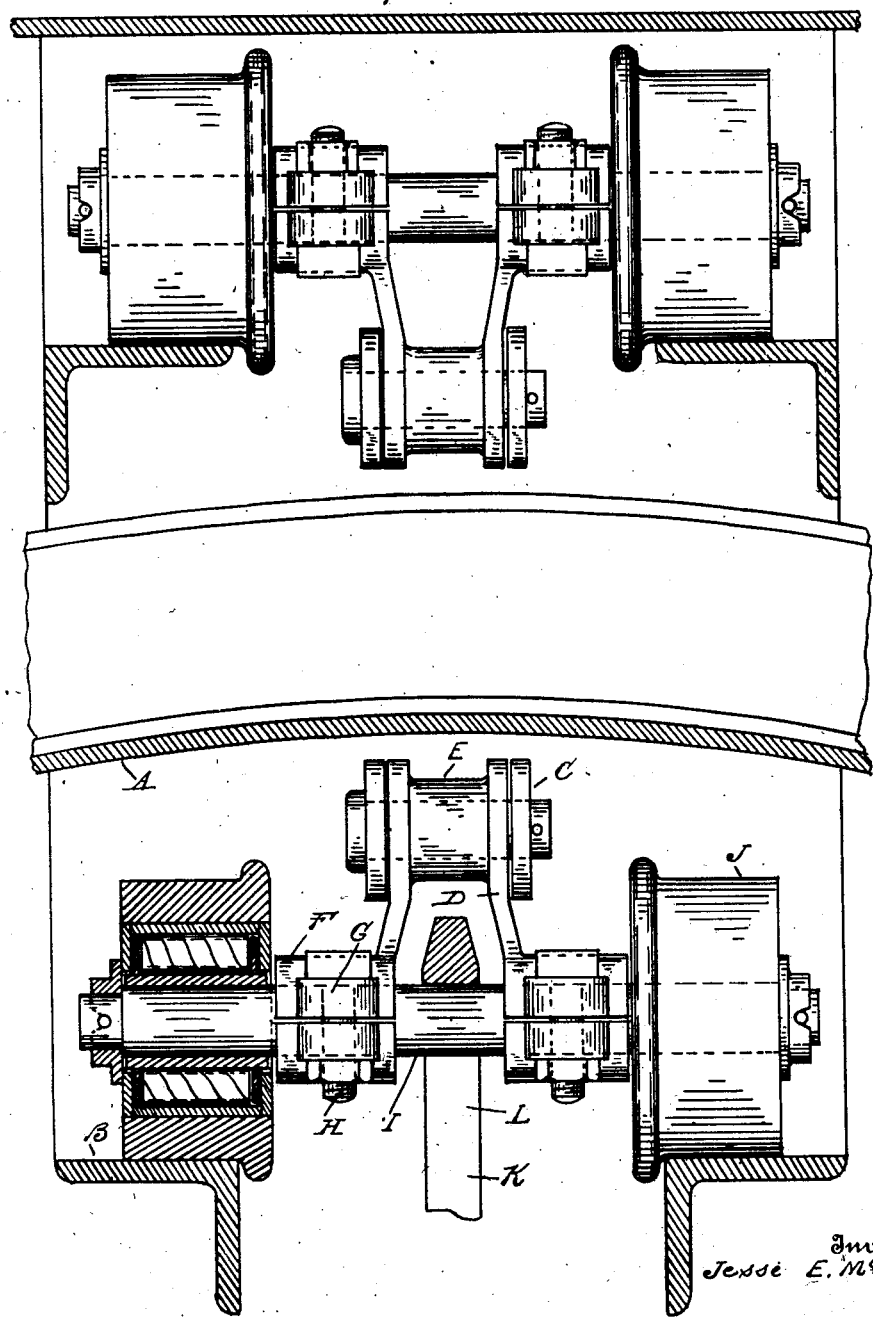
Figure 1 is a cross-section through a portion of an oven showing the arrangement of the trolley and portions of the conveyer inside and outside of the oven.

It is the object of the invention to obtain a simple and compact construction of trolley which is adapted for use where clearance space is small. Thus in the construction shown the oven A, which is of tunnel form having an arched roof, is provided with tracks B arranged in the upper portion of the tunnel as close to the roof as possible, so as to give the maximum space for the work. The conveyer C is a link chain and is located just beneath the roof and above the trolley axle. The trolley consists of a triangular member D having separated side plates cross-connected at opposite ends by the bearings E for the chain pivots. F are half-bearings on the depending central portion of the member D, said bearings projecting outward from the side plates and being provided with coöperating bearing caps G secured thereto by the bolts H. I is a trolley axle clamped in the bearings F, G and projecting beyond the same to form journals for the track wheels J. K is a work supporting hanger which at its upper end is formed into a hook L engaging the portion of the axle which is between the bearings F.

With the construction as described the hangers K may be readily engaged with the axles and disengaged therefrom and will carry the load directly into the track wheels and tracks B. At the same time the longitudinal movement of the conveyer is transmitted to the trolley through the medium of the links and triangular member D. As the chain is arranged in the center of the arch, clearance space is available, which would not be in the plane of the trolley wheels. Also the arrangement of the chain above the trolley axles permits of engaging the hangers with the axle without interference with the chain.

The return portion of the conveyer may be arranged outside of the tunnel, as shown in Fig. 1, the chain occupying the space between the tracks and as the hangers are detached before the return of the conveyer there will be nothing to interfere with this arrangement of parts.

What I claim as my invention is:

1. A conveyer trolley, comprising spaced triangular plates having connecting pivot bearings at two of the angles thereof and outwardly-extending bearings at the third angle, an axle clamped in said third bearing, trolley wheels journaled thereon, and a hanger hooked to engage said axle intermediate said plates.

2. A conveyer trolley, comprising spaced triangular plates having pivot bearings cross-connecting the same at two of the angles, half-bearings at the third angle extending outward from said plates, coöperating half-bearings, an axle clamped between said half-bearings, wheels journaled on said axle, and a hanger for engaging a portion of said axle intermediate said plates and clamping bearings.

3. A conveyer trolley, comprising spaced side plates having transversely extending pivot bearings at opposite ends thereof, bearings extending outward from said plates centrally between and beneath said pivot bearings, an axle clamped in said central bearings, and a hanger for engaging a portion of said axle intermediate said plates and clamping bearings.

In testimony whereof I affix my signature.

JESSE E. McBRIDE.